US009196241B2

(12) United States Patent
Bodin et al.

(10) Patent No.: US 9,196,241 B2
(45) Date of Patent: Nov. 24, 2015

(54) ASYNCHRONOUS COMMUNICATIONS USING MESSAGES RECORDED ON HANDHELD DEVICES

(75) Inventors: William K. Bodin, Austin, TX (US);
David Jaramillo, Lake Worth, FL (US);
Jesse W. Redman, Cedar Park, TX (US);
Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 11/536,733

(22) Filed: Sep. 29, 2006

(65) Prior Publication Data

US 2008/0082635 A1 Apr. 3, 2008

(51) Int. Cl.
*G06F 15/16* (2006.01)
*G10L 15/00* (2013.01)
*G10L 15/08* (2006.01)
*G10L 15/26* (2006.01)
(Continued)

(52) U.S. Cl.
CPC ............... *G10L 15/00* (2013.01); *G10L 15/08* (2013.01); *G10L 15/26* (2013.01); *H04L 12/5855* (2013.01); *H04L 51/14* (2013.01); *H04L 12/5895* (2013.01); *H04M 11/10* (2013.01); *H04M 2203/4518* (2013.01); *H04M 2203/4527* (2013.01); *H04M 2203/4536* (2013.01)

(58) Field of Classification Search
CPC ......... G10L 15/22; G10L 15/00; G10L 15/30; G10L 15/04; G10L 15/26; G10L 15/08; H04L 51/18; H04L 51/38; H04M 11/10; H04M 2203/4536; H04M 2203/4527

USPC .................................................. 709/206, 207
See application file for complete search history.

(56) References Cited

U.S. PATENT DOCUMENTS 4,785,408 A 11/1988 Britton
5,341,469 A 8/1994 Rossberg
5,377,354 A 12/1994 Scannell
(Continued)

FOREIGN PATENT DOCUMENTS

CN 1123075 5/1996
CN 1298173 6/2001
(Continued)

OTHER PUBLICATIONS

Text to Speech MP3 with Natural Voices 1.71, Published Oct. 5, 2004.
(Continued)

*Primary Examiner* — Emmanuel L Moise
*Assistant Examiner* — Xiang Yu
(74) *Attorney, Agent, or Firm* — Brevetto Law Group

(57) ABSTRACT

Methods, systems, and computer program products are provided for asynchronous communications. Embodiments include receiving a recorded message, the message recorded on a handheld device; converting the recorded message to text; identifying a recipient of the message in dependence upon the text; associating the message with content under management by a library management system in dependence upon the text; and storing the message for transmission to another handheld device for the recipient. Embodiments also typically include recording a message on handheld device and transferring a media file containing the recorded message to a library management system. Embodiments also typically include transmitting message to another handheld device.

18 Claims, 6 Drawing Sheets

(51) Int. Cl.
*H04L 12/58* (2006.01)
*H04M 11/10* (2006.01)

(56) References Cited

U.S. PATENT DOCUMENTS

| | | |
|---|---|---|
| 5,564,043 A | 10/1996 | Siefert |
| 5,715,370 A | 2/1998 | Luther |
| 5,732,216 A | 3/1998 | Logan |
| 5,774,131 A | 6/1998 | Kim |
| 5,819,220 A | 10/1998 | Sarukkai et al. |
| 5,884,266 A | 3/1999 | Dvorak |
| 5,892,825 A | 4/1999 | Mages et al. |
| 5,901,287 A | 5/1999 | Bull et al. |
| 5,903,727 A | 5/1999 | Nielsen |
| 5,911,776 A | 6/1999 | Guck |
| 5,978,463 A | 11/1999 | Jurkevics |
| 6,006,187 A | 12/1999 | Tanenblatt |
| 6,012,098 A | 1/2000 | Bayeh |
| 6,029,135 A | 2/2000 | Krasle |
| 6,032,260 A | 2/2000 | Sasmazel et al. |
| 6,044,347 A | 3/2000 | Abella |
| 6,055,525 A | 4/2000 | Nusbickel |
| 6,088,026 A | 7/2000 | Williams |
| 6,092,121 A | 7/2000 | Bennett |
| 6,115,686 A | 9/2000 | Chung |
| 6,141,693 A | 10/2000 | Perlman et al. |
| 6,178,511 B1 | 1/2001 | Cohen et al. |
| 6,199,076 B1 | 3/2001 | Logan |
| 6,233,318 B1 | 5/2001 | Picard |
| 6,240,391 B1 | 5/2001 | Ball et al. |
| 6,266,649 B1 | 7/2001 | Linden et al. |
| 6,282,511 B1 | 8/2001 | Mayer |
| 6,282,512 B1 | 8/2001 | Hemphill |
| 6,311,194 B1 | 10/2001 | Sheth et al. |
| 6,317,714 B1 | 11/2001 | Del Castillo |
| 6,463,440 B1 | 10/2002 | Hind et al. |
| 6,480,860 B1 | 11/2002 | Monday |
| 6,510,413 B1 | 1/2003 | Walker |
| 6,519,617 B1 | 2/2003 | Wanderski et al. |
| 6,532,477 B1 | 3/2003 | Tang |
| 6,563,770 B1 | 5/2003 | Kokhab |
| 6,574,599 B1 | 6/2003 | Lim |
| 6,593,943 B1 | 7/2003 | MacPhail |
| 6,594,637 B1 | 7/2003 | Furukawa |
| 6,604,076 B1 | 8/2003 | Holley |
| 6,611,876 B1 | 8/2003 | Barrett |
| 6,684,370 B1 | 1/2004 | Sikorsky |
| 6,687,678 B1 | 2/2004 | Yorimatsu |
| 6,731,993 B1 | 5/2004 | Carter |
| 6,771,743 B1 | 8/2004 | Butler et al. |
| 6,792,407 B2 | 9/2004 | Kibre |
| 6,802,041 B1 | 10/2004 | Rehm |
| 6,832,196 B2 | 12/2004 | Reich |
| 6,839,669 B1* | 1/2005 | Gould et al. ............ 704/246 |
| 6,859,527 B1 | 2/2005 | Banks |
| 6,901,403 B1 | 5/2005 | Bata |
| 6,912,691 B1 | 6/2005 | Dodrill et al. |
| 6,944,214 B1 | 9/2005 | Gilbert |
| 6,944,591 B1 | 9/2005 | Raghunandan |
| 6,965,569 B1 | 11/2005 | Carolan et al. |
| 6,976,082 B1 | 12/2005 | Ostermann et al. |
| 6,992,451 B2 | 1/2006 | Kamio |
| 6,993,476 B1 | 1/2006 | Dutta et al. |
| 7,017,120 B2 | 3/2006 | Shnier |
| 7,031,477 B1 | 4/2006 | Mella |
| 7,039,643 B2 | 5/2006 | Sena et al. |
| 7,046,772 B1 | 5/2006 | Moore et al. |
| 7,054,818 B2 | 5/2006 | Sharma |
| 7,062,437 B2 | 6/2006 | Kovales et al. |
| 7,065,222 B2 | 6/2006 | Wilcock |
| 7,069,092 B2 | 6/2006 | Wiser |
| 7,107,281 B2 | 9/2006 | De La Huerga |
| 7,113,909 B2 | 9/2006 | Nukaga |
| 7,120,702 B2 | 10/2006 | Huang et al. |
| 7,130,850 B2 | 10/2006 | Russell-Falla et al. |
| 7,139,713 B2 | 11/2006 | Falcon |
| 7,149,694 B1 | 12/2006 | Harb |
| 7,149,810 B1 | 12/2006 | Miller |
| 7,162,502 B2 | 1/2007 | Suarez |
| 7,171,411 B1 | 1/2007 | Lewis et al. |
| 7,178,100 B2 | 2/2007 | Call |
| 7,313,528 B1 | 12/2007 | Miller |
| 7,346,649 B1 | 3/2008 | Wong |
| 7,349,949 B1 | 3/2008 | Connor |
| 7,356,470 B2 | 4/2008 | Roth et al. |
| 7,366,712 B2 | 4/2008 | He et al. |
| 7,369,988 B1 | 5/2008 | Thenthiruperai |
| 7,386,575 B2 | 6/2008 | Bashant |
| 7,392,102 B2 | 6/2008 | Sullivan |
| 7,430,510 B1 | 9/2008 | De Fabbrizio |
| 7,437,408 B2 | 10/2008 | Schwartz |
| 7,454,346 B1 | 11/2008 | Dodrill et al. |
| 7,561,932 B1 | 7/2009 | Holmes |
| 7,568,213 B2 | 7/2009 | Carhart |
| 7,657,006 B2 | 2/2010 | Woodring |
| 7,685,525 B2 | 3/2010 | Kumar |
| 7,890,517 B2 | 2/2011 | Angelo |
| 2001/0014146 A1 | 8/2001 | Beyda |
| 2001/0027396 A1 | 10/2001 | Sato |
| 2001/0040900 A1 | 11/2001 | Salmi |
| 2001/0047349 A1 | 11/2001 | Easty et al. |
| 2001/0049725 A1 | 12/2001 | Kosuge |
| 2001/0054074 A1 | 12/2001 | Hayashi |
| 2002/0013708 A1 | 1/2002 | Walker et al. |
| 2002/0015480 A1 | 2/2002 | Daswani |
| 2002/0032564 A1 | 3/2002 | Ehsani et al. |
| 2002/0032776 A1 | 3/2002 | Hasegawa et al. |
| 2002/0039426 A1 | 4/2002 | Takemoto |
| 2002/0054090 A1 | 5/2002 | Silva et al. |
| 2002/0057678 A1 | 5/2002 | Jiang |
| 2002/0062216 A1 | 5/2002 | Guenther et al. |
| 2002/0062393 A1 | 5/2002 | Borger et al. |
| 2002/0083013 A1 | 6/2002 | Rollins et al. |
| 2002/0095292 A1* | 7/2002 | Mittal et al. ............ 704/270 |
| 2002/0120693 A1 | 8/2002 | Rudd |
| 2002/0128837 A1 | 9/2002 | Morin |
| 2002/0143414 A1 | 10/2002 | Wilcock |
| 2002/0151998 A1 | 10/2002 | Kemppi |
| 2002/0152210 A1 | 10/2002 | Johnson et al. |
| 2002/0169770 A1 | 11/2002 | Kim |
| 2002/0173964 A1 | 11/2002 | Reich |
| 2002/0178007 A1 | 11/2002 | Slotznick et al. |
| 2002/0193894 A1 | 12/2002 | Terada |
| 2002/0194286 A1 | 12/2002 | Matsuura et al. |
| 2002/0194480 A1 | 12/2002 | Nagao |
| 2002/0198714 A1 | 12/2002 | Zhou |
| 2002/0198720 A1 | 12/2002 | Takagi et al. |
| 2003/0018727 A1 | 1/2003 | Yamamoto |
| 2003/0028380 A1 | 2/2003 | Freeland et al. |
| 2003/0033331 A1 | 2/2003 | Sena et al. |
| 2003/0050776 A1* | 3/2003 | Blair ............ 704/235 |
| 2003/0055835 A1 | 3/2003 | Roth |
| 2003/0055868 A1 | 3/2003 | Fletcher et al. |
| 2003/0103606 A1 | 6/2003 | Rhie et al. |
| 2003/0108184 A1 | 6/2003 | Brown |
| 2003/0110185 A1 | 6/2003 | Rhoads |
| 2003/0110272 A1 | 6/2003 | du Castel et al. |
| 2003/0110297 A1 | 6/2003 | Tabatabai et al. |
| 2003/0115056 A1 | 6/2003 | Gusler et al. |
| 2003/0115064 A1 | 6/2003 | Gusler et al. |
| 2003/0115289 A1 | 6/2003 | Chinn |
| 2003/0126293 A1 | 7/2003 | Bushey |
| 2003/0132953 A1 | 7/2003 | Johnson et al. |
| 2003/0145062 A1 | 7/2003 | Sharma |
| 2003/0151618 A1 | 8/2003 | Johnson |
| 2003/0156130 A1 | 8/2003 | James |
| 2003/0158737 A1 | 8/2003 | Csicsatka |
| 2003/0160770 A1 | 8/2003 | Zimmerman |
| 2003/0163211 A1 | 8/2003 | Van Der Meulen |
| 2003/0167234 A1 | 9/2003 | Bodmer et al. |
| 2003/0172066 A1 | 9/2003 | Cooper et al. |
| 2003/0182000 A1 | 9/2003 | Muesch |
| 2003/0182124 A1 | 9/2003 | Khan |
| 2003/0187668 A1 | 10/2003 | Ullmann |

(56) References Cited

U.S. PATENT DOCUMENTS

| | | |
|---|---|---|
| 2003/0187726 A1 | 10/2003 | Bull |
| 2003/0188255 A1 | 10/2003 | Shimizu et al. |
| 2003/0212654 A1 | 11/2003 | Harper |
| 2003/0225599 A1 | 12/2003 | Mueller |
| 2003/0229847 A1 | 12/2003 | Kim |
| 2004/0003394 A1 | 1/2004 | Ramaswamy |
| 2004/0027958 A1 | 2/2004 | Takeuchi |
| 2004/0034653 A1 | 2/2004 | Maynor et al. |
| 2004/0041835 A1 | 3/2004 | Lu |
| 2004/0044665 A1 | 3/2004 | Nwabueze |
| 2004/0049477 A1 | 3/2004 | Powers |
| 2004/0068552 A1 | 4/2004 | Kotz et al. |
| 2004/0088063 A1 | 5/2004 | Hoshi |
| 2004/0088349 A1 | 5/2004 | Beck et al. |
| 2004/0093350 A1 | 5/2004 | Alexander |
| 2004/0107125 A1 | 6/2004 | Guheen |
| 2004/0120479 A1 | 6/2004 | Creamer |
| 2004/0128276 A1 | 7/2004 | Scanlon |
| 2004/0143430 A1 | 7/2004 | Said |
| 2004/0153178 A1 | 8/2004 | Koch |
| 2004/0172254 A1 | 9/2004 | Sharma |
| 2004/0199375 A1 | 10/2004 | Ehsani et al. |
| 2004/0201609 A1 | 10/2004 | Obrador |
| 2004/0210626 A1 | 10/2004 | Bodin |
| 2004/0225499 A1 | 11/2004 | Wang |
| 2004/0254851 A1 | 12/2004 | Himeno et al. |
| 2004/0267387 A1 | 12/2004 | Samadani |
| 2004/0267774 A1 | 12/2004 | Lin |
| 2005/0004992 A1 | 1/2005 | Horstmann |
| 2005/0015254 A1 | 1/2005 | Bearman |
| 2005/0015718 A1 | 1/2005 | Sambhus |
| 2005/0021826 A1 | 1/2005 | Kumar |
| 2005/0043940 A1 | 2/2005 | Elder |
| 2005/0045373 A1 | 3/2005 | Born |
| 2005/0065625 A1 | 3/2005 | Sass |
| 2005/0071780 A1 | 3/2005 | Muller et al. |
| 2005/0076365 A1 | 4/2005 | Popov et al. |
| 2005/0108521 A1 | 5/2005 | Silhavy et al. |
| 2005/0114139 A1 | 5/2005 | Dincer |
| 2005/0120083 A1 | 6/2005 | Aizawa |
| 2005/0137875 A1 | 6/2005 | Kim |
| 2005/0138063 A1 | 6/2005 | Bazot |
| 2005/0144002 A1 | 6/2005 | Ps |
| 2005/0144022 A1 | 6/2005 | Evans |
| 2005/0152344 A1 | 7/2005 | Chiu |
| 2005/0154580 A1 | 7/2005 | Horowitz |
| 2005/0154969 A1 | 7/2005 | Bodin |
| 2005/0190897 A1 | 9/2005 | Eberle |
| 2005/0195999 A1 | 9/2005 | Takemura |
| 2005/0203887 A1 | 9/2005 | Joshi |
| 2005/0203959 A1 | 9/2005 | Muller et al. |
| 2005/0203960 A1 | 9/2005 | Suarez |
| 2005/0232242 A1 | 10/2005 | Karaoguz et al. |
| 2005/0234727 A1 | 10/2005 | Chiu |
| 2005/0251513 A1 | 11/2005 | Tenazas |
| 2005/0262119 A1 | 11/2005 | Mawdsley |
| 2005/0288926 A1 | 12/2005 | Benco |
| 2006/0008252 A1 | 1/2006 | Kim |
| 2006/0020662 A1 | 1/2006 | Robinson |
| 2006/0031447 A1 | 2/2006 | Holt |
| 2006/0041549 A1 | 2/2006 | Gundersen |
| 2006/0048212 A1 | 3/2006 | Tsuruoka et al. |
| 2006/0050794 A1 | 3/2006 | Tan et al. |
| 2006/0050996 A1 | 3/2006 | King |
| 2006/0052089 A1 | 3/2006 | Khurana et al. |
| 2006/0075224 A1 | 4/2006 | Tao |
| 2006/0085199 A1 | 4/2006 | Jain |
| 2006/0095848 A1 | 5/2006 | Naik |
| 2006/0112844 A1 | 6/2006 | Hiller |
| 2006/0114987 A1 | 6/2006 | Roman |
| 2006/0123082 A1 | 6/2006 | Digate et al. |
| 2006/0135128 A1* | 6/2006 | Skoog .................. 455/412.1 |
| 2006/0136449 A1 | 6/2006 | Parker et al. |
| 2006/0140360 A1 | 6/2006 | Crago et al. |
| 2006/0149781 A1 | 7/2006 | Blankinship |
| 2006/0155698 A1 | 7/2006 | Vayssiere |
| 2006/0159109 A1 | 7/2006 | Lamkin et al. |
| 2006/0165104 A1 | 7/2006 | Kaye |
| 2006/0168507 A1 | 7/2006 | Hansen |
| 2006/0173985 A1 | 8/2006 | Moore |
| 2006/0184679 A1 | 8/2006 | Izdepski et al. |
| 2006/0190616 A1 | 8/2006 | Mayerhofer et al. |
| 2006/0193450 A1 | 8/2006 | Flynt |
| 2006/0200743 A1 | 9/2006 | Thong |
| 2006/0206533 A1 | 9/2006 | MacLaurin et al. |
| 2006/0224739 A1 | 10/2006 | Anantha |
| 2006/0233327 A1 | 10/2006 | Roberts et al. |
| 2006/0242663 A1 | 10/2006 | Gogerty |
| 2006/0253699 A1 | 11/2006 | Della-Libera |
| 2006/0265503 A1 | 11/2006 | Jones et al. |
| 2006/0282317 A1 | 12/2006 | Rosenberg |
| 2006/0282822 A1 | 12/2006 | Weng |
| 2006/0287745 A1 | 12/2006 | Richenstein |
| 2006/0288011 A1 | 12/2006 | Gandhi et al. |
| 2007/0005339 A1 | 1/2007 | Jaquinta |
| 2007/0027692 A1 | 2/2007 | Sharma |
| 2007/0027958 A1 | 2/2007 | Haslam |
| 2007/0043462 A1 | 2/2007 | Terada |
| 2007/0043735 A1 | 2/2007 | Bodin |
| 2007/0043758 A1 | 2/2007 | Bodin |
| 2007/0043759 A1 | 2/2007 | Bodin et al. |
| 2007/0061132 A1 | 3/2007 | Bodin |
| 2007/0061229 A1 | 3/2007 | Ramer et al. |
| 2007/0061266 A1 | 3/2007 | Moore et al. |
| 2007/0061371 A1 | 3/2007 | Bodin |
| 2007/0061401 A1 | 3/2007 | Bodin |
| 2007/0061711 A1 | 3/2007 | Bodin |
| 2007/0061712 A1 | 3/2007 | Bodin |
| 2007/0073728 A1 | 3/2007 | Klein et al. |
| 2007/0077921 A1 | 4/2007 | Hayashi et al. |
| 2007/0078655 A1 | 4/2007 | Semkow et al. |
| 2007/0083540 A1 | 4/2007 | Gundla et al. |
| 2007/0091206 A1 | 4/2007 | Bloebaum |
| 2007/0100628 A1 | 5/2007 | Bodin |
| 2007/0100629 A1 | 5/2007 | Bodin |
| 2007/0100787 A1 | 5/2007 | Lim |
| 2007/0100836 A1 | 5/2007 | Eichstaedt et al. |
| 2007/0101274 A1 | 5/2007 | Kurlander |
| 2007/0101313 A1 | 5/2007 | Bodin |
| 2007/0112844 A1 | 5/2007 | Tribble et al. |
| 2007/0118426 A1 | 5/2007 | Barnes, Jr. |
| 2007/0124458 A1 | 5/2007 | Kumar |
| 2007/0124802 A1 | 5/2007 | Anton et al. |
| 2007/0130589 A1 | 6/2007 | Davis et al. |
| 2007/0138999 A1 | 6/2007 | Lee |
| 2007/0147274 A1 | 6/2007 | Vasa et al. |
| 2007/0165538 A1 | 7/2007 | Bodin |
| 2007/0168191 A1 | 7/2007 | Bodin |
| 2007/0168194 A1 | 7/2007 | Bodin |
| 2007/0174326 A1 | 7/2007 | Schwartz et al. |
| 2007/0191008 A1 | 8/2007 | Bucher et al. |
| 2007/0192327 A1 | 8/2007 | Bodin |
| 2007/0192672 A1 | 8/2007 | Bodin |
| 2007/0192673 A1 | 8/2007 | Bodin |
| 2007/0192674 A1 | 8/2007 | Bodin |
| 2007/0192675 A1 | 8/2007 | Bodin |
| 2007/0192676 A1 | 8/2007 | Bodin |
| 2007/0192683 A1 | 8/2007 | Bodin |
| 2007/0192684 A1 | 8/2007 | Bodin |
| 2007/0198267 A1 | 8/2007 | Jones |
| 2007/0208687 A1 | 9/2007 | O'Conor et al. |
| 2007/0213857 A1 | 9/2007 | Bodin |
| 2007/0213986 A1 | 9/2007 | Bodin |
| 2007/0214147 A1 | 9/2007 | Bodin et al. |
| 2007/0214148 A1 | 9/2007 | Bodin |
| 2007/0214149 A1 | 9/2007 | Bodin |
| 2007/0214485 A1 | 9/2007 | Bodin |
| 2007/0220024 A1 | 9/2007 | Putterman et al. |
| 2007/0239837 A1 | 10/2007 | Jablokov |
| 2007/0253699 A1 | 11/2007 | Yen et al. |
| 2007/0276837 A1 | 11/2007 | Bodin et al. |
| 2007/0276865 A1 | 11/2007 | Bodin et al. |
| 2007/0276866 A1 | 11/2007 | Bodin et al. |
| 2007/0277088 A1 | 11/2007 | Bodin |

(56) References Cited

U.S. PATENT DOCUMENTS

| | | | |
|---|---|---|---|
| 2007/0277233 | A1 | 11/2007 | Bodin |
| 2008/0034278 | A1 | 2/2008 | Tsou et al. |
| 2008/0052415 | A1 | 2/2008 | Kellerman et al. |
| 2008/0082576 | A1 | 4/2008 | Bodin |
| 2008/0082635 | A1 | 4/2008 | Bodin |
| 2008/0155616 | A1 | 6/2008 | Logan |
| 2008/0161948 | A1 | 7/2008 | Bodin |
| 2008/0162131 | A1 | 7/2008 | Bodin |
| 2008/0162559 | A1 | 7/2008 | Bodin |
| 2008/0275893 | A1 | 11/2008 | Bodin et al. |
| 2009/0271178 | A1 | 10/2009 | Bodin |

FOREIGN PATENT DOCUMENTS

| | | |
|---|---|---|
| CN | 1368719 A | 9/2002 |
| EP | 1197884 | 4/2002 |
| GB | 236995 | 12/2002 |
| KR | 20010071517 | 7/2001 |
| KR | 20040078888 | 9/2004 |
| WO | WO 0182139 | 11/2001 |
| WO | WO 2005/106846 | 11/2005 |

OTHER PUBLICATIONS

Managing multimedia content and delivering services across multiple client platforms using XML, London Communications Symposium, xx, xx, Sep. 10, 2002, pp. 1-7.
PCT Search Report and Written Opinion International Application PCT/EP2007/050594.
Adapting Multimedia Internet Content for Universal Access, Rakesh Mohan, John R. Smith, Chung-Sheng Li, IEEE Transactions on Multimedia vol. 1, No. 1, p. 104-p. 144.
Office Action Dated May 24, 2006 in U.S. Appl. No. 11/420,018.
Office Action Dated Sep. 29, 2006 in U.S. Appl. No. 11/536,733.
Office Action Dated Jan. 3, 2007 in U.S. Appl. No. 11/619,253.
Office Action Dated May 24, 2006 in U.S. Appl. No. 11/420,016.
Office Action Dated May 24, 2006 in U.S. Appl. No. 11/420,015.
Office Action Dated Mar. 9, 2006 in U.S. Appl. No. 11/372,318.
Office Action Dated Mar. 9, 2006 in U.S. Appl. No. 11/372,329.
Office Action Dated Mar. 9, 2006 in U.S. Appl. No. 11/372,325.
Office Action Dated Mar. 9, 2006 in U.S. Appl. No. 11/372,323.
Office Action Dated Feb. 13, 2006 in U.S. Appl. No. 11/352,679.
Office Action Dated Feb. 13, 2006 in U.S. Appl. No. 11/352,824.
Office Action Dated Feb. 13, 2006 in U.S. Appl. No. 11/352,760.
Babara et al.; Bell Communications Research, Morristown, NJ; "The Audio Web"; pp. 97-104; 1997.
Monahan et al.; "Adapting Multimedia Internet Content for Universal Access"; IEEE Transactions on Multimedia, vol. 1, No. 1; pp. 104-114; 1999.
Lu et al.; "Audio Ticker"; Computer Networks and ISDN Systems, vol. 30, Issue 7, pp. 721-722, Apr. 1998.
Advertisement of EastBay Technologies, San Jose, CA; (author unknown); "IM Speak, Text to Speech Instant Messages"; from http://www.eastbaytech.com/im.htm website; Dec. 2005.
Advertisement of Odiogo, Inc. 410 Park Avenue, 15th floor, New York City, NY; (author unknown); "Create Text-To-Speech Podcast from RSS Feed with ODiofo for iPod, MP3 Player and Mobile Phone"; website; pp. 1-2; Dec. 13, 2006.
FeedForAll. Hanover, MA; (author unknown); "iTune Tutorial Tags"; from www.feedforall.com website; pp. 1-9; Jul. 11, 2006.
U.S. Appl. No. 11/331,692 Office Action mailed Aug. 17, 2009.
Advertisement of Audioblog.com Audio Publishing Services, Flower Mound, Texas; (author unknown); "Service Features"; from www. audioblog.com website; pp. 1-2; Sep. 23, 2004.
Zhang et al.; "XML-Based Advanced UDDI Search Mechanism for B2B Integration", Electronic Commerce Research, vol. 3, Nos. 1-2, 25-42, DOI: 10.1023/A:1021573226353; Kluwer Academic Publishers, The Netherlands, 2003.
Tian He et al., University of Virginia, Charlottesville, VA; "AIDA: Adaptive Application-Independent Data Aggregation in Wireless Sensor Networks" pp. 426-429, 432-449, and, 451-457; 2003.
Braun et al.; Fraunhofer Institute for Computer Graphics, Darmstadt, DE; ICAD 1998 "Using Sonic Hyperlinks in Web-TV"; pp. 1-10; 1998.
Braun et al.; IEEE Computer Society, Washington, DC; "Temporal Hypermedia for Multimedia Applications in the World Wide Web"; pp. 1-5; 1999.
Frankie, James, Computer Science Department, Stanford University; "AHA:Audio HTML Access"; pp. 1-13; 2007.
International Business Machines Corporation; PCT Search Report; Sep. 2, 2007; PCT Application No. PCT/EP2007/051260.
Hoschka, et al; "Synchronized Multimedia Integration Language (SMIL) 1.0 Specification"; pp. 1-43; found at website http://www.w3.org/TR/1998/PR-smil-19980409; Apr. 9, 1998.
Casalaina et al., "BMRC Procedures: RealMedia Guide"; pp. 1-7; Berkeley Multimedia Research Center, Berkeley, CA; found at http://web.archive.org/web/20030218131051/http://bmrc.berkeley.edu/info/procedures/rm.html; Feb. 13, 1998.
U.S. Appl. No. 11/352,710 Office Action mailed Jun. 11, 2009.
U.S. Appl. No. 11/352,727 Office Action mailed May 19, 2009.
U.S. Appl. No. 11/266,559 Final Office Action mailed Apr. 20, 2009.
U.S. Appl. No. 11/266,662 Final Office Action mailed Oct. 30, 2008.
U.S. Appl. No. 11/266,675 Final Office Action mailed Apr. 6, 2009.
U.S. Appl. No. 11/266,698 Final Office Action mailed Dec. 19, 2008.
U.S. Appl. No. 11/352,709 Office Action mailed May 14, 2009.
U.S. Appl. No. 11/207,911 Final Office Action mailed Apr. 29, 2008.
U.S. Appl. No. 11/207,911 Final Office Action mailed Apr. 15, 2009.
U.S. Appl. No. 11/226,747 Final Office Action mailed Sep. 25, 2008.
U.S. Appl. No. 11/266,744 Final Office Action mailed May 7, 2008.
U.S. Appl. No. 11/207,912 Final Office Action mailed May 7, 2008.
U.S. Appl. No. 11/207,912 Final Office Action mailed Apr. 28, 2009.
U.S. Appl. No. 11/266,663 Final Office Action mailed Sep. 16, 2008.
U.S. Appl. No. 11/331,694 Final Office Action mailed Mar. 30, 2009.
U.S. Appl. No. 11/331,692 Final Office Action mailed Feb. 9, 2009.
U.S. Appl. No. 11/207,914 Final Office Action mailed May 7, 2008.
U.S. Appl. No. 11/207,914 Final Office Action mailed Apr. 14, 2009.
U.S. Appl. No. 11/207,913 Final Office Action mailed Dec. 23, 2008.
U.S. Appl. No. 11/226,746 Final Office Action mailed Sep. 15, 2008.
U.S. Appl. No. 11/207,912 Office Action mailed Jan. 25, 2010.
U.S. Appl. No. 11/207,911 Notice of Allowance mailed Feb. 3, 2010.
U.S. Appl. No. 11/226,746 Final Office Action mailed Jul. 31, 2009.
U.S. Appl. No. 11/226,746 Office Action mailed Jan. 25, 2010.
U.S. Appl. No. 11/352,709 Final Office Action mailed Nov. 5, 2009.
U.S. Appl. No. 11/352,698 Office Action mailed Apr. 29, 2009.
U.S. Appl. No. 11/352,760, filed Feb. 2006, Bodin, et al.
U.S. Appl. No. 11/352,824, filed Feb. 2006, Bodin, et al.
U.S. Appl. No. 11/352,680, filed Feb. 2006, Bodin, et al.
U.S. Appl. No. 11,352,679, filed Feb. 2006, Bodin et al.
U.S. Appl. No. 11/372,323, filed Mar. 2006, Bodin et al.
U.S. Appl. No. 11/372,318, filed Mar. 2006, Bodin et al.
U.S. Appl. No. 11/372,319, filed Mar. 2006, Bodin et al.
U.S. Appl. No. 11/536,781, filed Sep. 2006, Bodin et al.
U.S. Appl. No. 11/420,014, filed May 2006, Bodin et al.
U.S. Appl. No. 11/420,015, filed May 2006, Bodin et al.
U.S. Appl. No. 11/420,016, filed May 2006, Bodin et al.
U.S. Appl. No. 11/420,017, filed May 2006, Bodin et al.
U.S. Appl. No. 11/420,018, filed May 2006, Bodin et al.
U.S. Appl. No. 11/536,733, filed Sep. 2006, Bodin et al.
U.S. Appl. No. 11/619,216, filed Jan. 2007, Bodin et al.
U.S. Appl. No. 11/619,253, filed Jan. 2007, Bodin, et al.
U.S. Appl. No. 12/178,448, filed Jul. 2008, Bodin, et al.
Office Action Dated Apr. 15, 2009 in U.S. Appl. No. 11/352,760.
Final Office Action Dated Nov. 16, 2009 in U.S. Appl. No. 11/352,760.
Notice of Allowance Dated Jun. 5, 2008 in U.S. Appl. No. 11/352,824.
Office Action Dated Jan. 22, 2008 in U.S. Appl. No. 11/352,824.
Final Office Action Dated Dec. 21, 2009 in U.S. Appl. No. 11/352,680.
Office Action Dated Apr. 30, 2009 in U.S. Appl. No. 11/352,679.
Final Office Action Dated Oct. 29, 2009 in U.S. Appl. No. 11/352,679.
Office Action Dated Oct. 28, 2008 in U.S. Appl. No. 11/372,323.
Office Action Dated Mar. 18, 2008 in U.S. Appl. No. 11/372,318.

(56) References Cited

OTHER PUBLICATIONS

Final Office Action Dated Jul. 9, 2008 in U.S. Appl. No. 11/372,318.
Final Office Action Dated Nov. 6, 2009 in U.S. Appl. No. 11/372,329.
Office Action Dated Feb. 25, 2009 in U.S. Appl. No. 11/372,325.
Office Action Dated Feb. 27, 2009 in U.S. Appl. No. 11/372,329.
Final Office Action Dated Jan. 15, 2010 in U.S. Appl. No. 11/536,781.
Office Action Dated Mar. 20, 2008 in U.S. Appl. No. 11/420,015.
Final Office Action Dated Sep. 3, 2008 in U.S. Appl. No. 11/420,015.
Office Action Dated Dec. 2, 2008 in U.S. Appl. No. 11/420,015.
Office Action Dated Mar. 3, 2008 in U.S. Appl. No. 11/420,016.
Final Office Action Dated Aug. 29, 2008 in U.S. Appl. No. 11/420,016.
Final Office Action Dated Dec. 31, 2009 in U.S. Appl. No. 11/420,017.
Office Action Dated Mar. 21, 2008 in U.S. Appl. No. 11/420,018.
Final Office Action Dated Aug. 29, 2008 in U.S. Appl. No. 11/420,018.
Office Action Dated Dec. 3, 2008 in U.S. Appl. No. 11/420,018.
Office Action Dated Dec. 30, 2008 in U.S. Appl. No. 11/536,733.
Office Action Dated Jan. 26, 2010 in U.S. Appl. No. 11/619,216.
Office Action Dated Apr. 2, 2009 in U.S. Appl. No. 11/619,253.
Office Action Dated Jun. 25, 2010 in U.S. Appl. No. 11/619,216.
Buchana et al., "Representing Aggregated Works in the Digital Library", ACM, 2007, pp. 247-256.
Office Action, U.S. Appl. No. 11/352,760, Sep. 16, 2010.
Office Action, U.S. Appl. No. 11/352,680, Jun. 10, 2010.
Final Office Action, U.S. Appl. No. 11/352,680, Sep. 7, 2010.
Office Action, U.S. Appl. No. 11/352,679, May 28, 2010.
Final Office Action, U.S. Appl. No. 11/352,679, Nov. 15, 2010.
Office Action, U.S. Appl. No. 11/372,317, Sep. 23, 2010.
Final Office Action, U.S. Appl. No. 11/372,329, Nov. 6, 2009.
Office Action, U.S. Appl. No. 11/372,319, Apr. 21, 2010.
Final Office Action, U.S. Appl. No. 11/372,319, Jul. 2, 2010.
Final Office Action, U.S. Appl. No. 11/420,014, Apr. 3, 2010.
Final Office Action, U.S. Appl. No. 11/420,017, Sep. 23, 2010.
Final Office Action, U.S. Appl. No. 11/619,216, Jun. 25, 2010.
Final Office Action, U.S. Appl. No. 11/619,236, Oct. 22, 2010.
Office Action, U.S. Appl. No. 12/178,448, Apr. 2, 2010.
Final Office Action, U.S. Appl. No. 12/178,448, Sep. 14, 2010.
Office Action Dated Jun. 23, 2009 in U.S. Appl. No. 11/352,680.
Office Action Dated Jul. 8, 2009 in U.S. Appl. No. 11/372,317.
Final Office Action Dated Jul. 22, 2009 in U.S. Appl. No. 11/536,733.
Office Action Dated Jul. 9, 2009 in U.S. Appl. No. 11/420,017.
Office Action Dated Jul. 17, 2009 in U.S. Appl. No. 11/536,781.
Office Action Dated Jul. 23, 2009 in U.S. Appl. No. 11/420,014.
Final Office Action Dated Jul. 21, 2009 in U.S. Appl. No. 11/420,018.

\* cited by examiner

ASYNCHRONOUS COMMUNICATIONS USING MESSAGES RECORDED ON HANDHELD DEVICES

BACKGROUND OF THE INVENTION

1. Field of the Invention

The field of the invention is data processing, or, more specifically, methods, systems, and products for asynchronous communications using messages recorded on handheld devices.

2. Description of Related Art

Managers are increasingly isolated from one another and their employees. One reason for this isolation is that managers are often time constrained and their communication occurs with many different devices and often communications requires two or more managers or employees to be available at the same time. There therefore is a need for improvement in communications among users such as managers and employees that reduces the devices used to communicate and reduces the requirement for more than one user to communicate at the same time.

SUMMARY OF THE INVENTION

Methods, systems, and computer program products are provided for asynchronous communications. Embodiments include receiving a recorded message, the message recorded on a handheld device; converting the recorded message to text; identifying a recipient of the message in dependence upon the text; associating the message with content under management by a library management system in dependence upon the text; and storing the message for transmission to another handheld device for the recipient. Embodiments also typically include recording a message on handheld device and transferring a media file containing the recorded message to a library management system. Embodiments also typically include transmitting message to another handheld device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
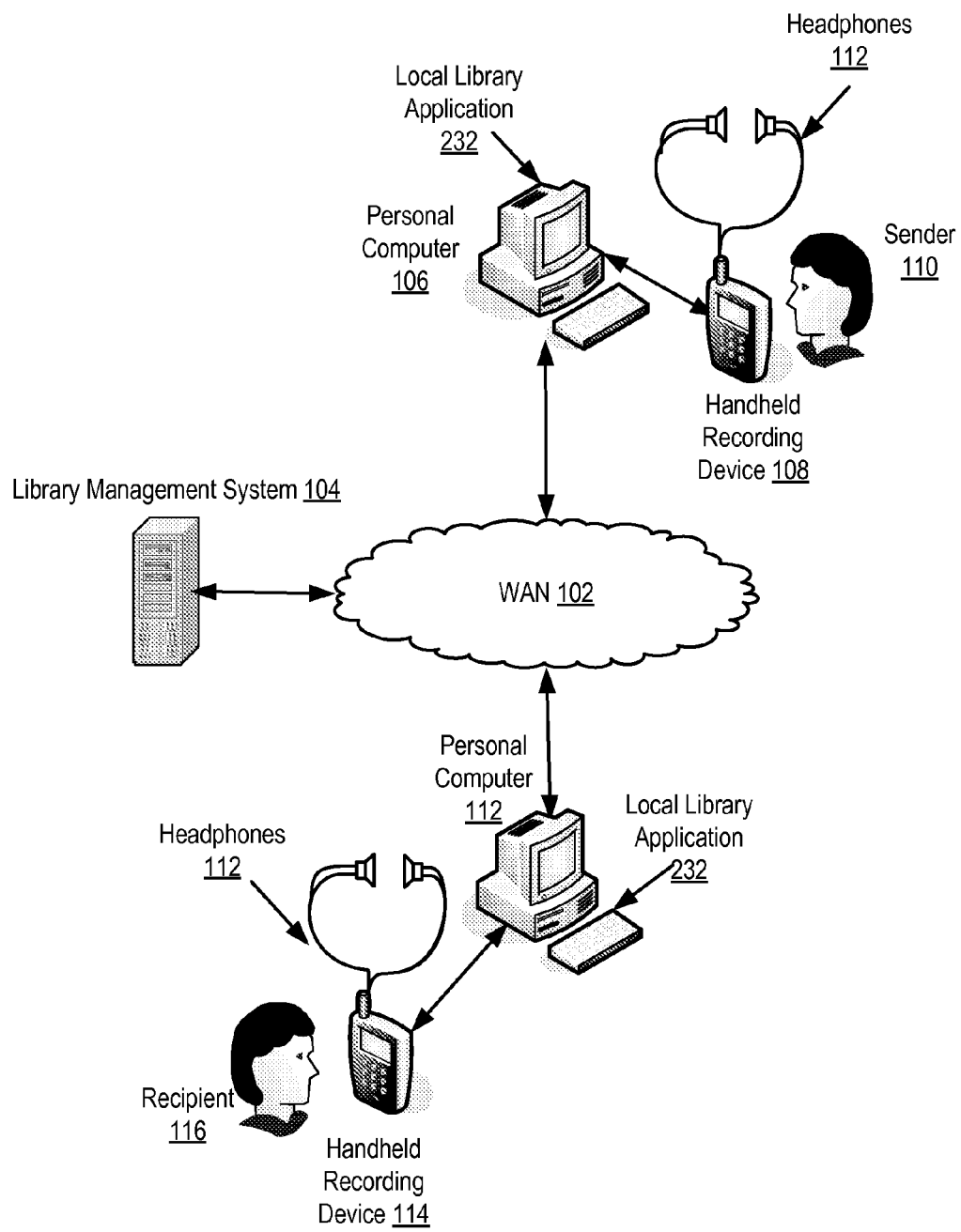
FIG. 1 sets forth a network diagram of a system for asynchronous communications using messages recorded on handheld devices according to embodiments of the present invention.

Exemplary methods, systems, and products for asynchronous communications in accordance with the present invention are described with reference to the accompanying drawings, beginning with FIG. 1. FIG. 1 sets forth a network diagram of a system for asynchronous communications using messages recorded on handheld devices according to embodiments of the present invention. Asynchronous communications means communications among parties that occurs with some time delay. Asynchronous communications according to the present invention advantageously allows participants of communications to send, receive, and respond to communications at their own convenience with no requirement to be available simultaneously.

The system of FIG. 1 includes to personal computers (106 and 112) coupled for data communications to a wide area network ('WAN') (102). Each of the personal computers (106 and 112) of FIG. 1 have installed upon them a local library application (232). A local library application (232) includes computer program instructions capable of transferring media files containing recorded messages to a handheld recording device (108 and 114). The local library application (232) also includes computer program instructions capable of receiving media files containing messages from the handheld recording device (108 and 114) and transmitting the media files to a library management system (104).

The example of FIG. 1 also includes a library management system (104). The library management system of FIG. 1 is capable of asynchronous communications by receiving a recorded message having been recorded on a handheld device (108) converting the recorded message to text; identifying a recipient (116) of the message in dependence upon the text; associating the message with content under management by a library management system in dependence upon the text; and storing the message for transmission to another handheld device (114) for the recipient. The exemplary library management system (104) of FIG. 1 manages asynchronous communications using recorded messages according to the present invention, as well as additional content associated with those recorded messages. Such associated content under management include, for example, other recorded messages created by senders and recipients, emails, media files containing media content, spreadsheets, presentations, RSS ('Really Simple Syndication') feeds, web pages, and well as any other content that will occur to those of skill in the art. Maintaining the content as well as managing asynchronous communications relating to that content advantageously provides tight coupling between the communications between users and the content related to those communications. Such tight coupling provides the ability to determine that content under management is the subject of the communications and therefore provide an identification of such content to a recipient. Such tight coupling also provides the ability to attach that content to the message providing together the content which is the subject of the communications and the communications themselves.

The exemplary system of FIG. 1 is capable of asynchronous communications according to the present invention by recording a message from a sender (110) on handheld device (108). The handheld recording device includes a microphone for receiving speech of the message and is capable of recording the message in a media file. One handheld recording device useful according to embodiments of the present invention is the WP-U2J available from Samsung.

The exemplary system of FIG. 1 is capable of transferring the media file containing the recorded message from the handheld recording device (108) to a local library application (232). Media files containing one or messages may be transferred to the local library application by periodically synchronizing the handheld recording device with the local library application allowing a sender to begin transmission of the message at the convenience of the sender.

The exemplary system of FIG. 1 is also capable of transferring the media file containing the recorded message to a library management system (104). The library management system comprises computer program instructions capable of receiving a recorded message; converting the recorded message to text; identifying a recipient of the message in dependence upon the text; associating the message with content under management by a library management system in dependence upon the text; and storing the message for transmission to another handheld device for the recipient The exemplary system of FIG. 1 is also capable of transferring the media file containing the recorded message to a local library application (232) installed on a personal computer (112). The system of FIG. 1 is also capable of transmitting message to the handheld recording device (114) of the recipient (116) who may listen to the message using headphones (112) or speakers on the device. A recipient may transfer messages to the handheld device by synchronizing the handheld recording device with the local library application (232) allowing the recipient to obtain messages at the recipients convenience. The recipient may now respond to the sender in the same manner providing two way asynchronous communications between sender and recipient.

The arrangement of devices making up the exemplary system illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Asynchronous communications in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary library management system (104) useful in asynchronous communications according to embodiments of the present invention. The library management system (104) of FIG. 2 includes at least one computer processor (156) or 'CPU' as well as random access memory (168) ('RAM') which is connected through a system bus (160) to processor (156) and to other components of the library management system.

Stored in RAM (168) is a library management application (202) for asynchronous communications according to the present invention including computer program instructions for receiving a recorded message, the message recorded on a handheld device; converting the recorded message to text; identifying a recipient of the message in dependence upon the text; associating the message with content under management by a library management system in dependence upon the text; and storing the message for transmission to another handheld device for the recipient.

Figure 2:
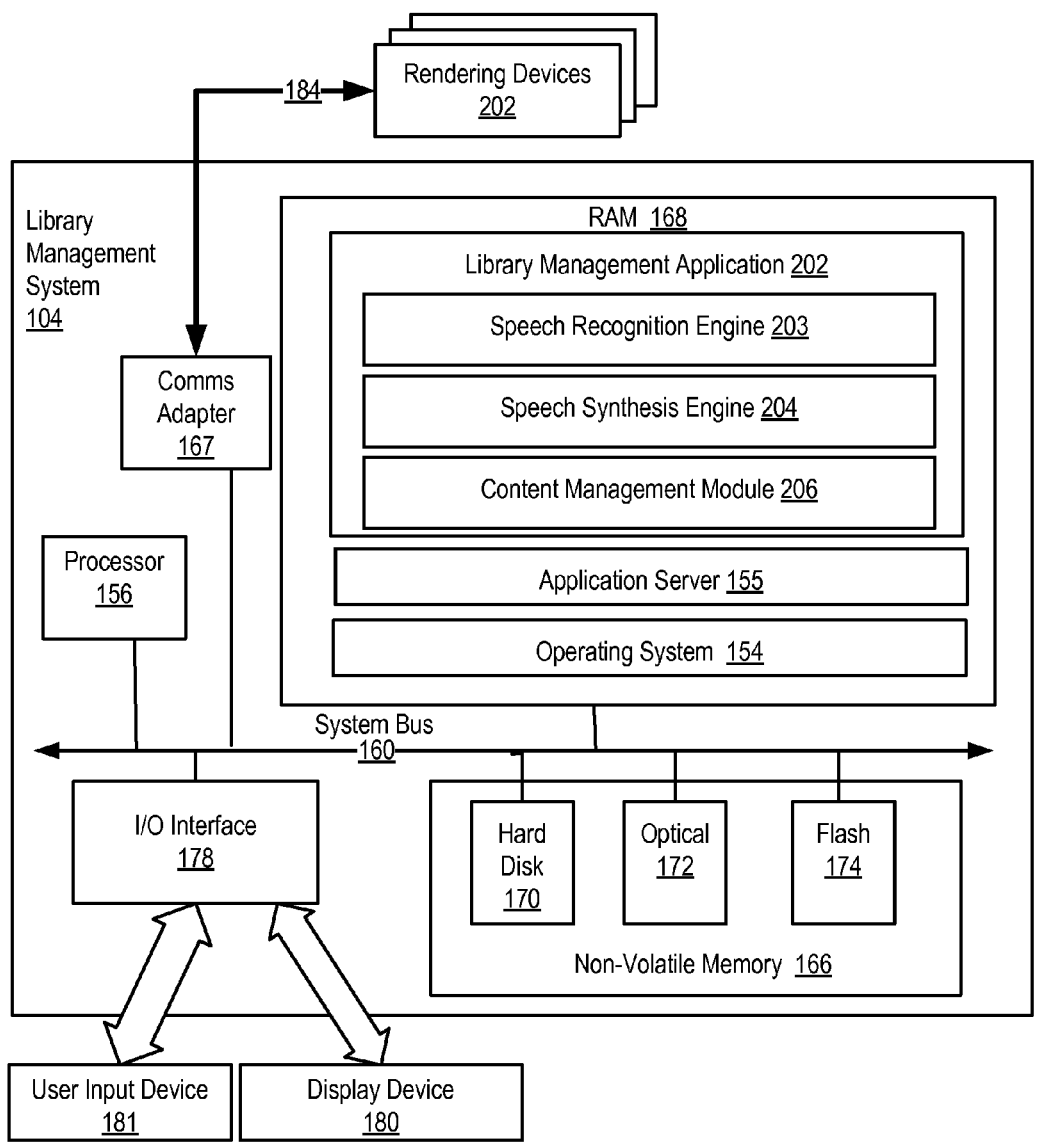
FIG. 2 sets forth a block diagram of automated computing machinery comprising an exemplary library management system useful in asynchronous communications according to embodiments of the present invention.

The library management application (202) of FIG. 2 includes a speech recognition engine (203), computer program instructions for converting a recorded message to text. Examples of speech recognition engines capable of modification for use with library management applications according to the present invention include SpeechWorks available from Nuance Communications, Dragon NaturallySpeaking also available from Nuance Communications, ViaVoice available from IBM®, Speech Magic available from Philips Speech Recognition Systems, iListen from MacSpeech, Inc., and others as will occur to those of skill in the art.

The library management application (202) of FIG. 2 includes a speech synthesis engine (204), computer program instructions for creating speech identifying the content associated with the message. Examples of speech engines capable of creating speech identifying the content associated with the message, for example, IBM's ViaVoice Text-to-Speech, Acapela Multimedia TTS, AT&T Natural Voices™ Text-to-Speech Engine, and Python's pyTTS class.

The library management application (202) of FIG. 2 includes a content management module (206), computer program instructions for receiving a recorded message; identifying a recipient of the message in dependence upon text converted from the message; associating the message with content under management by a library management system in dependence upon the text; and storing the message for transmission to another handheld device for the recipient.

Also stored in RAM (168) is an application server (155), a software platform that provides services and infrastructure required to develop and deploy business logic necessary to provide web clients with access to enterprise information systems. Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154) and library management module (202) in the example of FIG. 2 are shown in RAM (168), but many components of such software typically are stored in non-volatile memory (166) also.

Library management system (104) of FIG. 2 includes non-volatile computer memory (166) coupled through a system bus (160) to processor (156) and to other components of the library management system (104). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary library management system of FIG. 2 includes one or more input/output interface adapters (178). Input/output interface adapters in library management systems implement user-oriented input/output through, for example, software drivers and computer hardware for controlling output to display devices (180) such as computer display screens, as well as user input from user input devices (181) such as keyboards and mice.

The exemplary library management system (104) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for asynchronous communications according to embodiments of the present invention include modems for wired dial-up communications, Ethernet (IEEE 802.3) adapters for wired network communications, and 802.11b adapters for wireless network communications.

Figure 3:
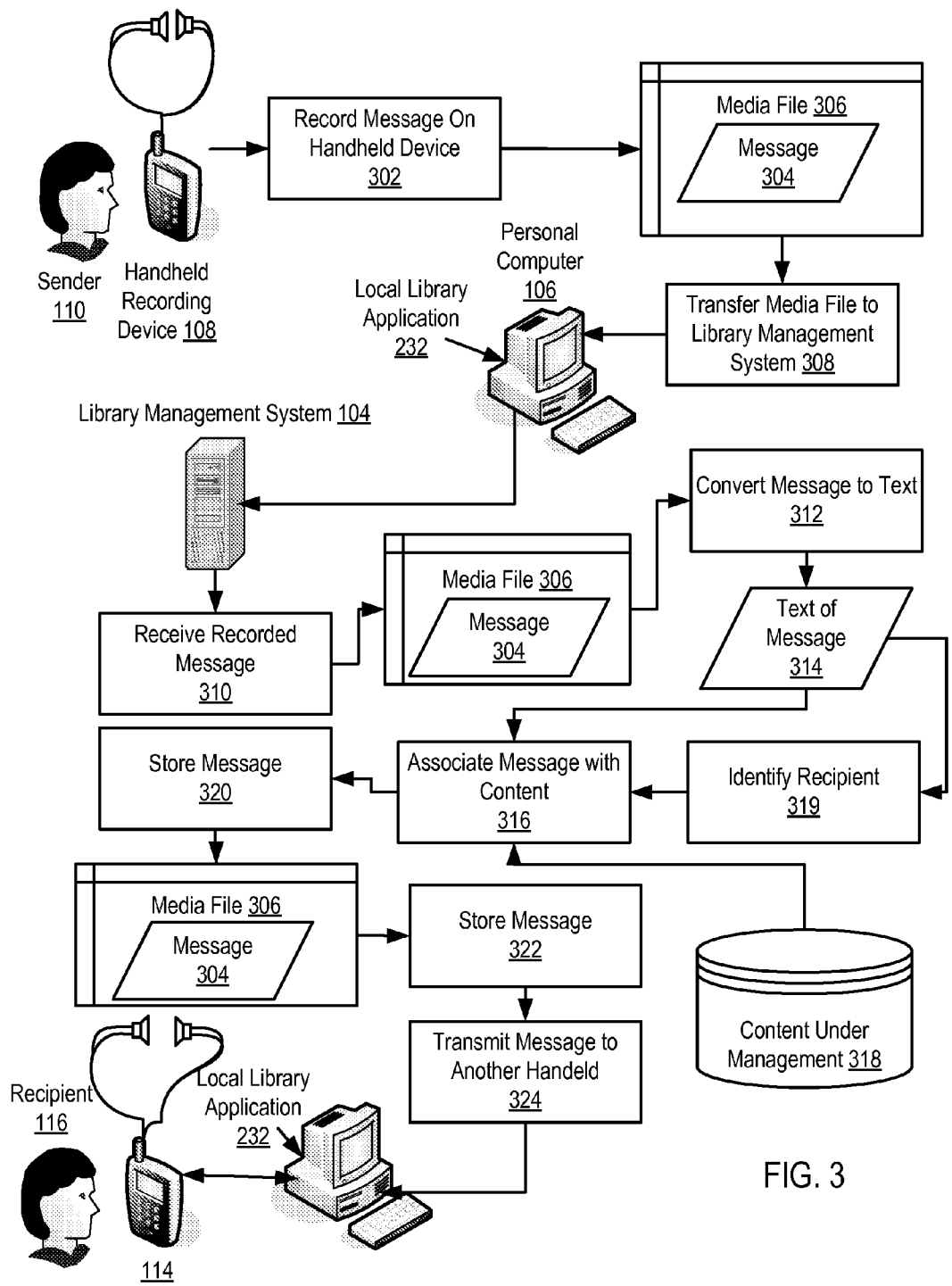
FIG. 3 sets forth a flow chart illustrating an exemplary method for asynchronous communications according to embodiments of the present invention.

For further explanation, FIG. 3 sets forth a flow chart illustrating an exemplary method for asynchronous communications according to embodiments of the present invention that includes recording (302) a message (304) on handheld device (108). in the example of FIG. 3 a sender (110) records a speech message on a handheld recording device (108) in a media file (306) of the data format supported by the handheld recording device (108). Examples of media files useful in asynchronous communications according to the present invention include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art.

The method of FIG. 3 includes transferring (308) a media file (306) containing the recorded message (304) to a library management system (104). As discussed above, one way of transferring (308) a media file (306) containing the recorded message (304) to a library management system (104) includes synchronizing the handheld recording device (108) with a local library application (232) which in turns uploads the media file to the local management system. Synchronizing the handheld recording device (108) with a local library application (232) advantageously allows a sender to record messages at the sender's convenience and also the sender to initiate the sending of those messages at the sender's convenience.

The method of FIG. 3 also includes receiving (310) the recorded message (304). In the example of FIG. 3, a library management system (104) receives the recorded message in a media file from a local library application (232). Local library applications (232) according to the present invention may be configured to upload messages from a sender to a library management system (104) and download messages for a recipient from a library management system (104) periodically, such as daily, hourly and so on, upon synchronization with handheld recording devices, or in any other manner as will occur to those of skill in the art.

The method of FIG. 3 also includes converting (312) the recorded message (304) to text (314). Converting (312) the recorded message (304) to text (314) may be carried out by a speech recognition engine. Speech recognition is the process of converting a speech signal to a set of words, by means of an algorithm implemented as a computer program. Different types of speech recognition engines currently exist. Isolated-word speech recognition systems, for example, require the speaker to pause briefly between words, whereas a continuous speech recognition systems do not. Furthermore, some speech recognition systems require a user to provide samples of his or her own speech before using them, whereas other systems are said to be speaker-independent and do not require a user to provide samples.

To accommodate larger vocabularies, speech recognition engines use language models or artificial grammars to restrict the combination of words and increase accuracy. The simplest language model can be specified as a finite-state network, where the permissible words following each word are explicitly given. More general language models approximating natural language are specified in terms of a context-sensitive grammar.

Examples of commercial speech recognition engines currently available include SpeechWorks available from Nuance Communications, Dragon NaturallySpeaking also available from Nuance Communications, ViaVoice available from IBM®, Speech Magic available from Philips Speech Recognition Systems, iListen from MacSpeech, Inc., and others as will occur to those of skill in the art.

The method of FIG. 3 also includes identifying (319) a recipient (116) of the message (304) in dependence upon the text (314). Identifying (319) a recipient (116) of the message (304) in dependence upon the text (314) may be carried out by scanning the text for previously identified names or user identifications. Upon finding a match, identifying (319) a recipient (116) of the message (304) may be carried out by retrieving a user profile for the identified recipient including information facilitating sending the message to the recipient.

The method of FIG. 3 also includes associating (316) the message (304) with content (318) under management by a library management system in dependence upon the text (314). Associating (316) the message (304) with content (318) under management by a library management system in dependence upon the text (314) may be carried out by creating speech identifying the content associated with the message; and associating the speech with the recorded message for transmission with the recorded message as discussed below with reference to FIG. 4. Associating (316) the message (304) with content (318) under management by a library management system in dependence upon the text (314) may also be carried out by extracting keywords from the text; and searching content under management for the keywords as discussed below with reference to FIG. 5. Associating (316) the message (304) with content (318) under management by a library management system in dependence upon the text (314) may also be carried out by extracting an explicit identification of the associated content from the text; and searching content under management for the identified content as discussed below with reference with FIG. 6.

The method of FIG. 3 also includes storing (320) the message (304) for transmission to another handheld device (114) for the recipient (116). In the example of FIG. 3, a library management system (104) stores the message for downloading to local library application (232) for the recipient.

The method of FIG. 3 also includes transmitting (324) the message (304) to another handheld device (114). Transmitting (324) the message (304) to another handheld device (114) according to the method of FIG. 3 may be carried out by downloading the message to a local library application (232) for the recipient (116) and synchronizing the handheld recording device (114) with the local library application (232). Local library applications (232) according to the present invention may be configured to download messages for a recipient from a library management system (104) periodically, such as daily, hourly and so on, upon synchronization with handheld recording devices, or in any other manner as will occur to those of skill in the art.

To aid users in communication, content identified as associated with communications among users may be identified, described in speech, and presented to those users thereby seamlessly supplementing the existing communications among the users. For further explanation, FIG. 4 sets forth a flow chart illustrating an exemplary method for associating (316) the message (304) with content (318) under management by a library management system in dependence upon the text (314). The method of FIG. 4 includes creating (408) speech (412) identifying the content (318) associated with the message (304). Creating (408) speech (412) identifying the content (318) associated with the message (304) may be carried out by processing the text using a text-to-speech engine in order to produce a speech presentation of the text and then recording the speech produced by the text-speech-engine in the audio portion of a media file. Examples of speech engines capable of converting text to speech for recording in the audio portion of a media file include, for example, IBM's ViaVoice Text-to-Speech, Acapela Multimedia TTS, AT&T Natural Voices™ Text-to-Speech Engine, and Python's pyTTS class. Each of these text-to-speech engines is composed of a front end that takes input in the form of text and outputs a symbolic linguistic representation to a back end that outputs the received symbolic linguistic representation as a speech waveform.

Typically, speech synthesis engines operate by using one or more of the following categories of speech synthesis: articulatory synthesis, formant synthesis, and concatenative synthesis. Articulatory synthesis uses computational biomechanical models of speech production, such as models for the glottis and the moving vocal tract. Typically, an articulatory synthesizer is controlled by simulated representations of muscle actions of the human articulators, such as the tongue, the lips, and the glottis. Computational biomechanical models of speech production solve time-dependent, 3-dimensional differential equations to compute the synthetic speech output. Typically, articulatory synthesis has very high computational requirements, and has lower results in terms of natural-sounding fluent speech than the other two methods discussed below.

Formant synthesis uses a set of rules for controlling a highly simplified source-filter model that assumes that the glottal source is completely independent from a filter which represents the vocal tract. The filter that represents the vocal tract is determined by control parameters such as formant frequencies and bandwidths. Each formant is associated with a particular resonance, or peak in the filter characteristic, of the vocal tract. The glottal source generates either stylized glottal pulses for periodic sounds and generates noise for aspiration. Formant synthesis often generates highly intelligible, but not completely natural sounding speech. However, formant synthesis typically has a low memory footprint and only moderate computational requirements.

Concatenative synthesis uses actual snippets of recorded speech that are cut from recordings and stored in an inventory or voice database, either as waveforms or as encoded speech. These snippets make up the elementary speech segments such as, for example, phones and diphones. Phones are composed of a vowel or a consonant, whereas diphones are composed of phone-to-phone transitions that encompass the second half of one phone plus the first half of the next phone. Some concatenative synthesizers use so-called demi-syllables, in effect applying the diphone method to the time scale of syllables. Concatenative synthesis then strings together, or concatenates, elementary speech segments selected from the voice database, and, after optional decoding, outputs the resulting speech signal. Because concatenative systems use snippets of recorded speech, they often have the highest potential for sounding like natural speech, but concatenative systems typically require large amounts of database storage for the voice database.

Figure 4:
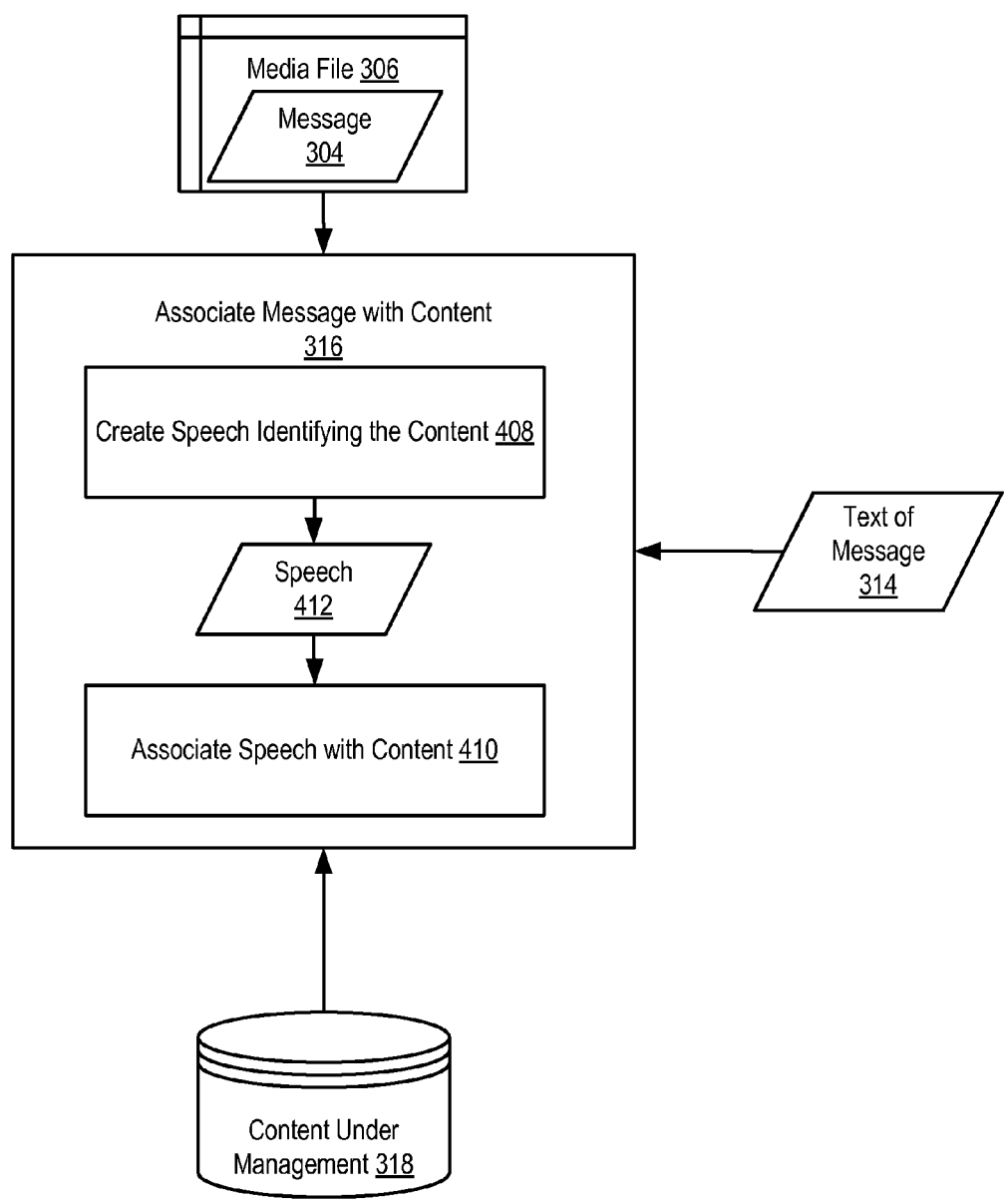
FIG. 4 sets forth a flow chart illustrating an exemplary method for associating the message with content under management by a library management system in dependence upon the text converted from a recorded message.

The method of FIG. 4 also includes associating (410) the speech (412) with the recorded message (304) for transmission with the recorded message (304). Associating (410) the speech (412) with the recorded message (304) for transmission with the recorded message (304) may be carried out by including the speech in the same media file as the recoded message, creating a new media file containing both the recorded message and the created speech, or any other method of associating the speech with the recorded message as will occur to those of skill in the art.

As discussed above, associated messages with content under management often requires identifying the content. For further explanation, FIG. 5 sets forth a flow chart illustrating another method for associating (316) the message (304) with content (318) under management by a library management system in dependence upon the text (314). The method of FIG. 5 includes extracting (402) keywords (403) from the text (314). Extracting (402) keywords (403) from the text (314) may be carried out by extracting words from the text that elicit information about content associated with the subject matter of the message such as, for example, 'politics,' 'work,' 'movies,' and so. Extracting (402) keywords (403) from the text (314) also may be carried out by extracting words from the text identifying types of content such as, for example, 'email,' 'file,' 'presentation,' and so on. Extracting (402) keywords (403) from the text (314) also may be carried out by extracting words from the text having temporal semantics, such as 'yesterday,' 'Monday,' '10:00 am.' and so on. The examples of extracting words indicative of subject matter, content type, or temporal semantics are presented for explanation and not for limitation. In fact, associating (316) the message (304) with content (318) under management by a library management system in dependence upon the text (314) may be carried out in many was as will occur to those of skill in the art and all such ways are within the scope of the present invention.

Figure 5:
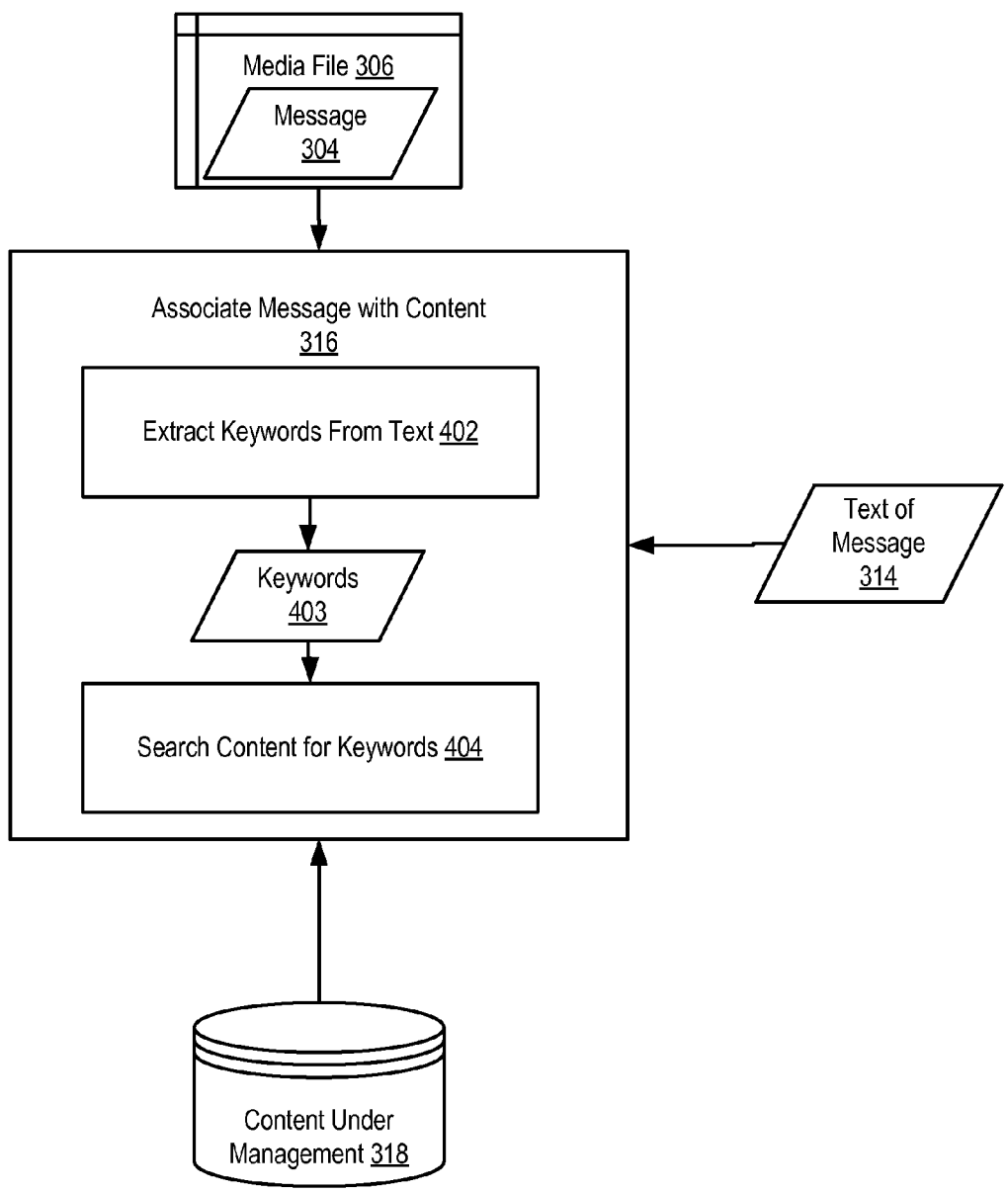
FIG. 5 sets forth a flow chart illustrating another method for associating the message with content under management by a library management system in dependence upon the text converted from a recorded message.
Figure 6:
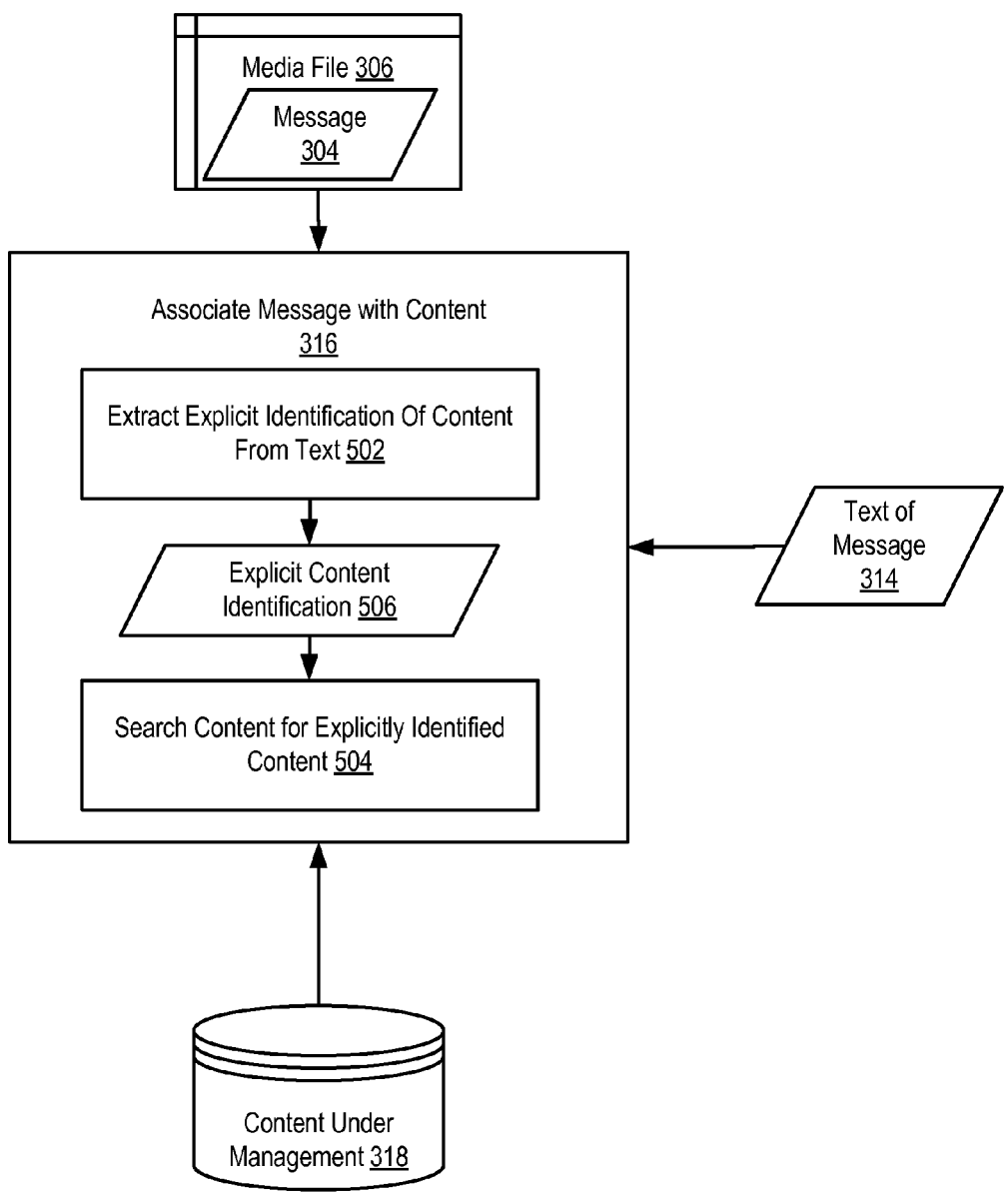
FIG. 6 sets forth a flow chart illustrating another method for associating the message with content under management by a library management system in dependence upon the text converted from a recorded message.

The method of FIG. 5 also includes searching (404) content (318) under management for the keywords (403). Searching (404) content (318) under management for the keywords (403) may be carried out by searching the titles, metadata, and content itself for the keywords and identifying as a match content having the most matching keywords or content having the best matching keywords according to predefined algorithms for selecting matching content from potential matches.

In some cases, the messages comprising communications among users may contain an explicit identification of content under management. For further explanation, FIG. 6 sets forth a flow chart illustrating another method for associating (316) the message (304) with content (318) under management by a library management system in dependence upon the text (314) includes extracting (502) an explicit identification (506) of the associated content from the text and searching content (318) under management for the identified content (506). Extracting (502) an explicit identification (506) of the associated content from the text may be carried out by identifying one or more words in the text matching a title or closely matching a title or metadata identification of specific content under management. For example, the phrase 'the Jones Presentation,' may be extracted as an explicit identification of a PowerPoint™ Presentation entitled 'Jones Presentation May 2, 2006.' For example, the phrase 'Your message of Yesterday,' may be extracted as an explicit identification of a message from the intended recipient of the message send a day earlier than the current message from which the text was converted according to the present invention.

Exemplary embodiments of the present invention are described largely in the context of a fully functional computer system for asynchronous communications using messages recorded on handheld devices. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for asynchronous communications, the method comprising:
    receiving at a library management system a recorded speech message from a call of a sender to a handheld device of a recipient, wherein the recorded speech message was recorded by the sender for the recipient to listen to on the handheld device, and wherein the sender is a first human user and the recipient is a second human user;
    converting the recorded speech message to text;
    identifying a recipient of the recorded speech message in dependence upon the text;
    extracting keywords from the text;
    searching content under management for the keywords;
    associating the recorded speech message with content under management by a library management system in dependence upon the text, wherein associating the recorded speech message with content under management by a library management system in dependence upon the text further comprises identifying the associated content based on one or more of the keywords matching a title or metadata identification of the content under management; and
    storing the recorded speech message and the associated content for transmission to another handheld device for the recipient.

2. The method of claim 1, further comprising recording a speech message on handheld device and transferring a media file containing the recorded speech message to a library management system.

3. The method of claim 1 further comprising transmitting the recorded speech message to another handheld device.

4. The method of claim 1 wherein associating the recorded speech message with content under management by a library management system in dependence upon the text further comprises:
    creating speech identifying the content associated with the recorded speech message; and
    associating the speech with the recorded speech message for transmission with the recorded speech message.

5. The method of claim 1 wherein the extracting of the keywords comprises extracting an explicit identification of the associated content from the text; and
    wherein the searching of the content comprises searching content under management for the identified content.

6. The method of claim 1, wherein the content under management comprises recorded messages from other senders and content of other types including one or more of emails, media files containing media content, spreadsheets, presentations, RSS ("Really Simple Syndication") feeds and web pages.

7. A system for asynchronous communications, the system comprising a computer processor, a computer memory operatively coupled to the computer processor, the computer memory having disposed within it computer program instructions capable of:
    receiving at a library management system a recorded speech message from a call of a sender to a handheld device of a recipient, wherein the recorded speech message was recorded by the sender for the recipient to listen to on the handheld device, and wherein the sender is a first human user and the recipient is a second human user;
    converting the recorded speech message to text;
    identifying a recipient of the recorded speech message in dependence upon the text;
    extracting keywords from the text;
    searching content under management for the keywords;
    associating the recorded speech message with content under management by a library management system in dependence upon the text, wherein associating the recorded speech message with content under management by a library management system in dependence upon the text further comprises identifying the associated content based on one or more of the keywords matching a title or metadata identification of the content under management; and
    storing the recorded speech message and the associated content for transmission to another handheld device for the recipient.

8. The system of claim 7 wherein the computer memory also has disposed with in it computer program instructions capable of:
    recording a speech message on handheld device; and
    transferring a media file containing the recorded speech message to a library management system.

9. The system of claim 7 wherein the computer memory also has disposed with in it computer program instructions capable of transmitting the recorded speech message to another handheld device.

10. The system of claim 7 wherein computer program instructions capable of associating the recorded speech message with content under management by a library management system in dependence upon the text further comprise computer program instructions capable of:
    creating speech identifying the content associated with the recorded speech message; and
    associating the speech with the recorded speech message for transmission with the recorded speech message.

11. The system of claim 7 wherein the extracting of the keywords comprises extracting an explicit identification of the associated content from the text; and
wherein the searching of the content comprises searching content under management for the identified content.

12. The system of claim 7, wherein the content under management comprises recorded messages from other senders and content of other types including one or more of emails, media files containing media content, spreadsheets, presentations, RSS ("Really Simple Syndication") feeds and web pages.

13. A computer program product for asynchronous communications, the computer program product embodied on a non-transitory computer-readable medium, the computer program product comprising:
computer program instructions for receiving at a library management system a recorded speech message from a call of a sender to a handheld device of a recipient, wherein the recorded speech message was recorded by the sender for the recipient to listen to on the handheld device, and wherein the sender is a first human user and the recipient is a second human user;
computer program instructions for converting the recorded speech message to text;
computer program instructions for identifying a recipient of the recorded speech message in dependence upon the text;
computer program instructions for extracting keywords from the text;
computer program instructions for searching content under management for the keywords;
computer program instructions for associating the recorded speech message with content under management by a library management system in dependence upon the text, wherein associating the recorded speech message with content under management by a library management system in dependence upon the text further comprises identifying the associated content based on one or more of the keywords matching a title or metadata identification of the content under management; and
computer program instructions for storing the recorded speech message and the associated content for transmission to another handheld device for the recipient.

14. The computer program product of claim 13 further comprising computer program instructions for recording a speech message on handheld device and computer program instructions for transferring a media file containing the recorded speech message to a library management system.

15. The computer program product of claim 13 further comprising computer program instructions for transmitting the recorded speech message to another handheld device.

16. The computer program product of claim 13 wherein computer program instructions for associating the recorded speech message with content under management by a library management system in dependence upon the text further comprise:
computer program instructions for creating speech identifying the content associated with the recorded speech message; and
computer program instructions for associating the speech with the recorded speech message for transmission with the recorded speech message.

17. The computer program product of claim 13 wherein the computer program instructions for extracting keywords from the text further comprise computer program instructions for extracting an explicit identification of the associated content from the text; and
wherein the computer program instructions for searching of the content comprises computer program instructions for searching content under management for the identified content.

18. The computer program product of claim 13, wherein the content under management comprises recorded messages from other senders and content of other types including one or more of emails, media files containing media content, spreadsheets, presentations, RSS ("Really Simple Syndication") feeds and web pages.

* * * * *